United States Patent [19]
Gualtieri et al.

[11] Patent Number: 5,957,001
[45] Date of Patent: Sep. 28, 1999

[54] TRANSMISSION CONTROL LEVER WITH USER INTERFACE

[75] Inventors: Sharon Lynn Gualtieri, Schoolcraft; Jeffrey James Johnson, Marshall, both of Mich.

[73] Assignee: Eaton Corporation, Cleveland, Ohio

[21] Appl. No.: 08/847,179

[22] Filed: May 1, 1997

[51] Int. Cl.$^6$ .................................................. B60K 20/00
[52] U.S. Cl. ..................... 74/473.12; 200/61.88
[58] Field of Search ............................ 200/61.88, 61.91; 74/473.12, 473.19

[56] References Cited

U.S. PATENT DOCUMENTS

| 366,439 | 1/1887 | Allen, Jr. et al. . | |
|---|---|---|---|
| 5,315,900 | 5/1994 | Teeter . | |
| 5,481,077 | 1/1996 | Clegg et al. | 200/61.88 |
| 5,519,256 | 5/1996 | Goodridge | 200/61.88 |
| 5,566,586 | 10/1996 | Lauer et al. | 200/61.88 |
| 5,602,525 | 2/1997 | Hsu | 200/61.88 |

FOREIGN PATENT DOCUMENTS

| 0 629 526 A1 | 12/1994 | European Pat. Off. . |
|---|---|---|
| 2071184 | 4/1971 | France . |
| 3901 649 A1 | 8/1990 | Germany . |
| 44 33 573 A1 | 3/1996 | Germany . |
| WO 94/26549 A1 | 11/1994 | WIPO . |

OTHER PUBLICATIONS

Derwent Abstract of DE 3901649 A1 to Berghorn; Feb. 8, 1990.

Verified translation of DE 39 01 649 A1.

Primary Examiner—Tamara L. Graysay
Assistant Examiner—David Fenstermacher
Attorney, Agent, or Firm—Brooks & Kushman P.C.

[57] ABSTRACT

A user interface for mounting on a motor vehicle transmission control lever includes a first plurality of switches for operating a cruise control module, a second plurality of switches for controlling activation level of an engine brake; and a ratio switch for modifying a transmission ratio determined by position of the transmission control lever. The first and second pluralities of switches and the ratio switch are positioned to be thumb-operable without palm repositioning.

20 Claims, 5 Drawing Sheets

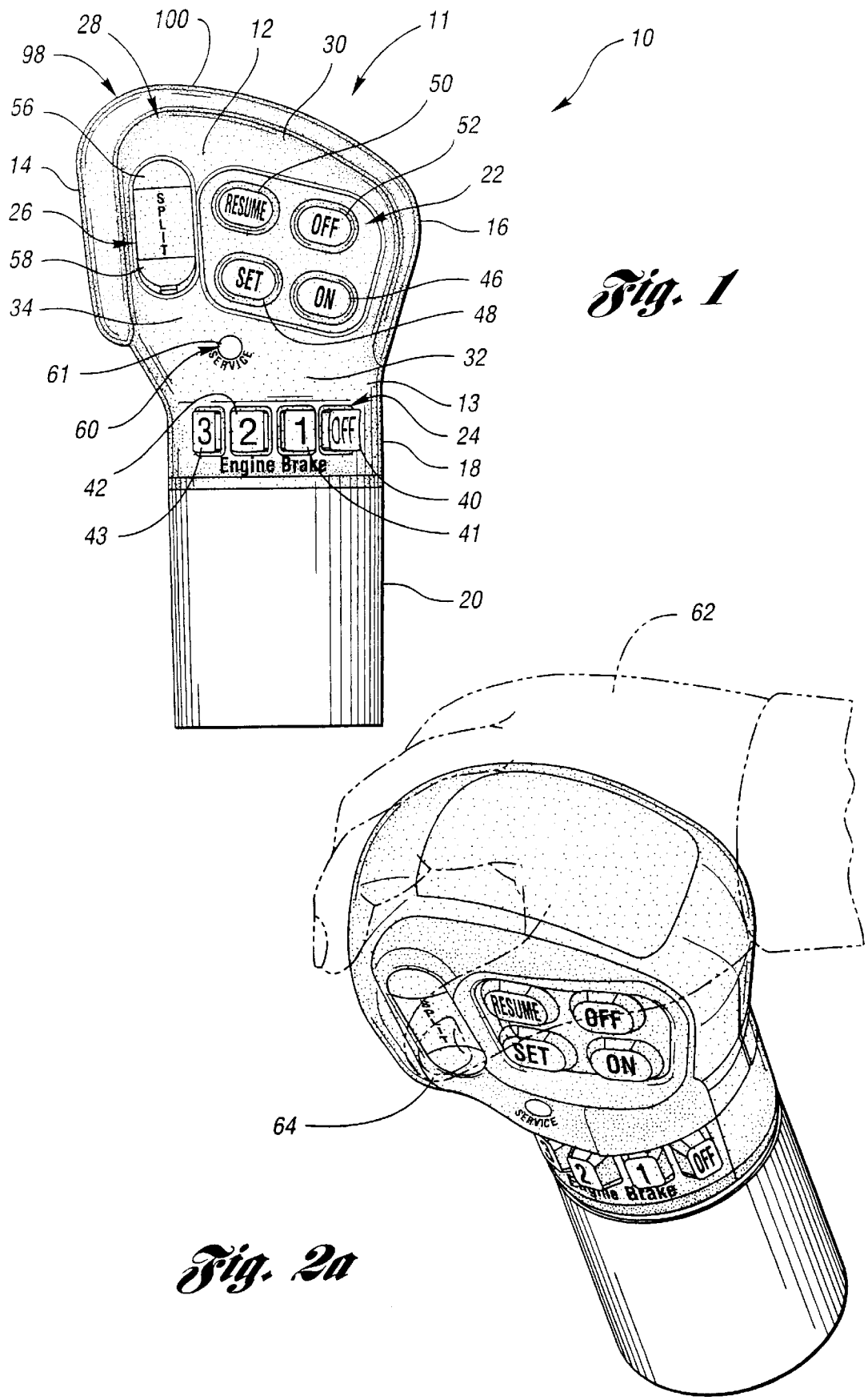

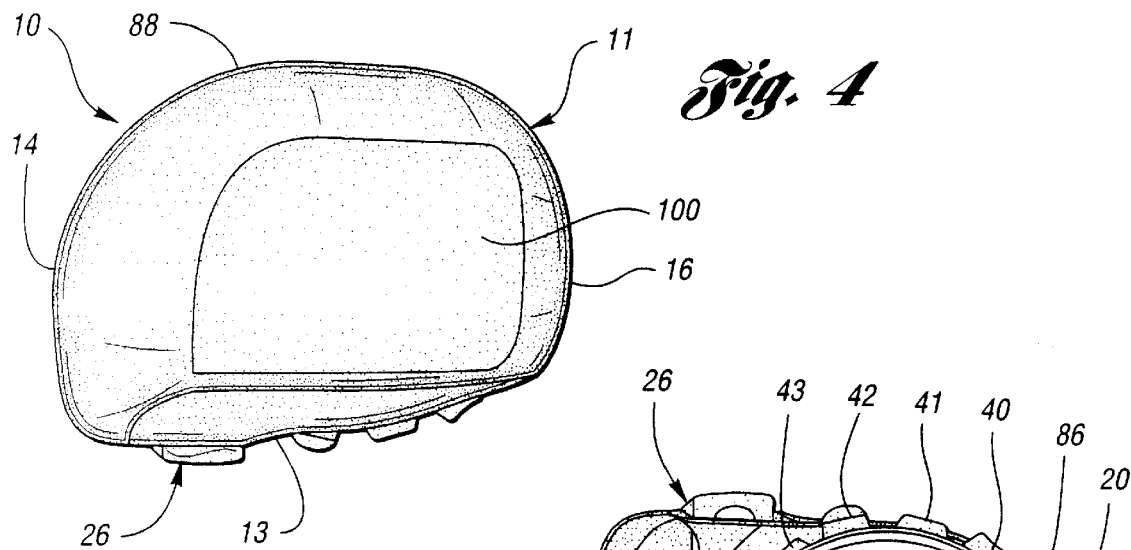
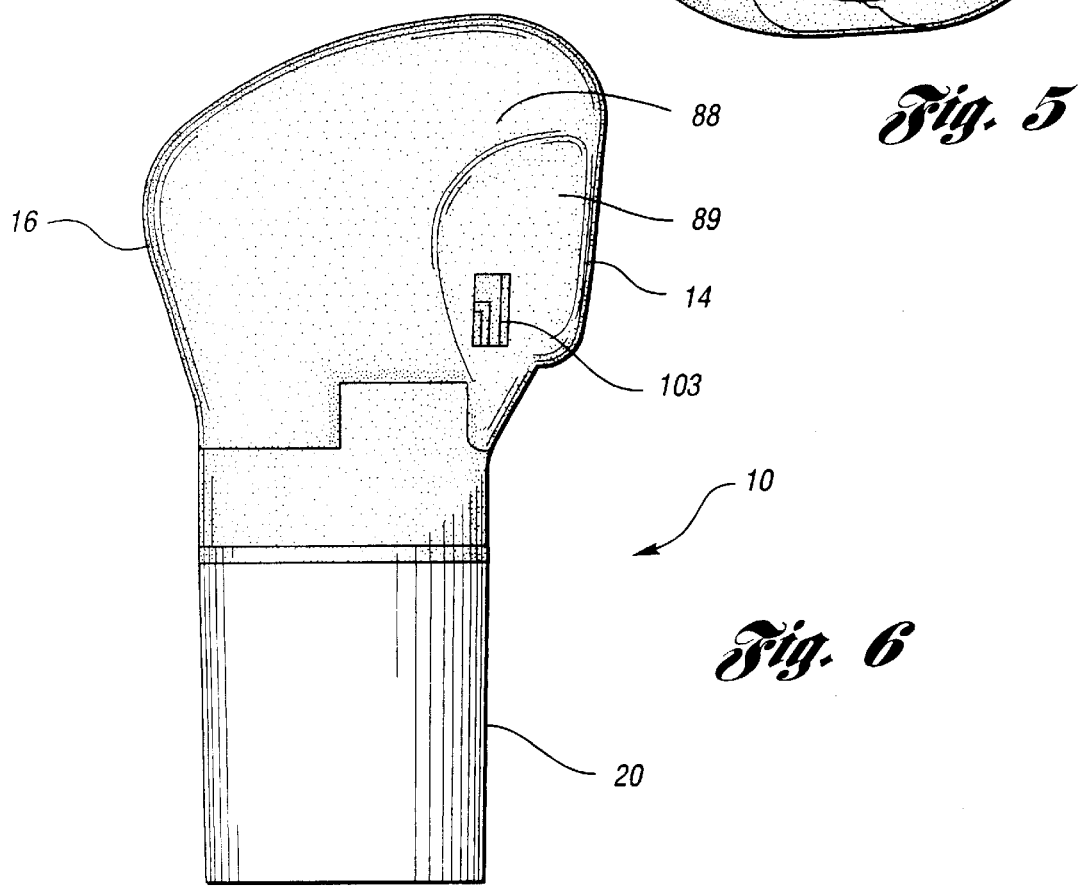

TRANSMISSION CONTROL LEVER WITH USER INTERFACE

TECHNICAL FIELD

This invention relates to a transmission control lever with a user interface for use with an electronic transmission.

BACKGROUND ART

Drivers of motor vehicles are provided with a variety of switches and levers with which to control various features of the vehicle. For example, frequently used functions governed by switches and levers may include transmission gear shifting and auxiliary gearset control, cruise control operation, and engine braking, among others. For purposes of shifting the transmission gears, a gear shift control lever is typically connected to the transmission and used to control the gearbox to manually shift transmission gears among various gear ratios. A control lever may also be used in automatic or automated mechanical transmissions to select a particular gear or to indicate the desire to change gears.

Engine braking switches have traditionally been located on the floor or dashboard for use in controlling the braking of a vehicle's engine. Cruise control switches are typically located on the dashboard, the steering wheel, or the turn signal lever to operate various cruise control functions. Auxiliary gearset switches, such as those used to control the splitter and/or range of a multispeed compound transmission, have been located on the dashboard or steering wheel to provide convenient access to the vehicle operator.

Because the above described vehicle functions are repeatedly manipulated by the driver of the vehicle, they should normally be ergonomically and conveniently located so that the driver is able to actuate them with little effort and without diverting attention from the road.

A number of prior art systems have attempted to place various controls within convenient reach of the driver. For example, U.S. Pat. No. 5,315,900 issued to Teeter and assigned to the assignee of the present invention discloses a transmission control lever having cruise and engine brake control switches. U.S. Design Pat. No. D366,439 issued to Allen, Jr. et al. discloses a design for a gear shift lever having cruise control, wherein three cruise control switches are shown on the top of the lever. This design assumes that drivers hold the gear shift lever by wrapping their hand around the side of the lever. However, the prior art does not provide an ergonomic gear shift lever which is capable of being gripped both from the top and from the side, which provides for integrated operation of various engine and/or vehicle functions.

Consequently, a need has developed for a transmission control lever which allows for ergonomically and conveniently positioned switches positioned thereon for activating and operating the vehicle cruise control features, multispeed auxiliary gearset, and engine braking features which accommodates drivers who use top hand positioning as well as wraparound positioning.

BRIEF SUMMARY OF THE INVENTION

It is a principal object of the present invention to provide a transmission control lever having ergonomic placement of a multispeed auxiliary gearset switch (such as the splitter or range-change switch for a compound change-gear or change-speed transmission), cruise control switches, and engine brake switches.

It is another object of the present invention to provide a transmission control lever which eliminates substantially all hand movement while allowing operation of various functions without diverting attention of the driver.

It is a further object of the present invention to provide a transmission control lever which allows a driver to position his or her hand around either the top or the side of the lever.

It is a still another object of the present invention to provide a transmission control lever which allows convenient control of the multispeed auxiliary gearset, cruise control, and engine brake.

In carrying out the above objects, and other objects, features, and advantages, the present invention provides a user interface for mounting on a motor vehicle transmission control lever. The interface includes a first plurality of switches for operating a cruise control module. The first plurality of switches is preferably recessed. The interface also includes a second plurality of switches for controlling activation of an engine brake. The second plurality of switches is preferably raised. Further, the interface includes a ratio switch for modifying a transmission ratio determined by position of the transmission control lever. The first and second pluralities of switches and the ratio switch are positioned on the interface to be thumb-operable without palm repositioning. Preferably, the ratio switch is raised and controls operation of a splitter auxiliary gearset in a multi-speed compound transmission. However, it may equally be used for a range-change auxiliary gearset.

In one embodiment, the first and second pluralities of switches and the ratio switch are positioned to be thumb-operable using top hand positioning and from a wrapped hand, or side positioning. It is preferable that each switch be within about 2.5 inches of a top surface of the user interface. In another embodiment, the user interface includes a service indicator, such as a light, to alert the driver of a need for service. The first and second pluralities of switches and the ratio switch are positioned on a side of the user interface which is the side generally facing a driver's seat when installed on the control lever in a vehicle. Also included is a cushioned portion substantially encompassing the first plurality of switches and the ratio switch, the cushioned portion having an arcuate top serving as a palm rest for a top-resting shifting position.

The above objects and other objects, features and advantages of the present invention are readily apparent from the following detailed description of the best modes for carrying out the invention when taken in connection with the accompanying drawings wherein like reference numerals correspond to like components.

BRIEF DESCRIPTION OF THE DRAWINGS

FIG. 1 is a side elevational view of a transmission control lever according to the present invention displaying the various function control switches included thereon;

FIG. 2a is a perspective view of a transmission control lever of FIG. 1 with an operator right hand (shown in phantom) positioned on top of the control lever so that the operator's thumb may activate and control the various function control switches;

FIG. 4 is a top plan view of the transmission control lever according to the present invention;

FIG. 5 is a bottom view of the transmission control lever according to the present invention;

FIG. 6 is a side elevational view of the transmission control lever according to the present invention;

BEST MODE FOR CARRYING OUT THE INVENTION

Figure 2B:
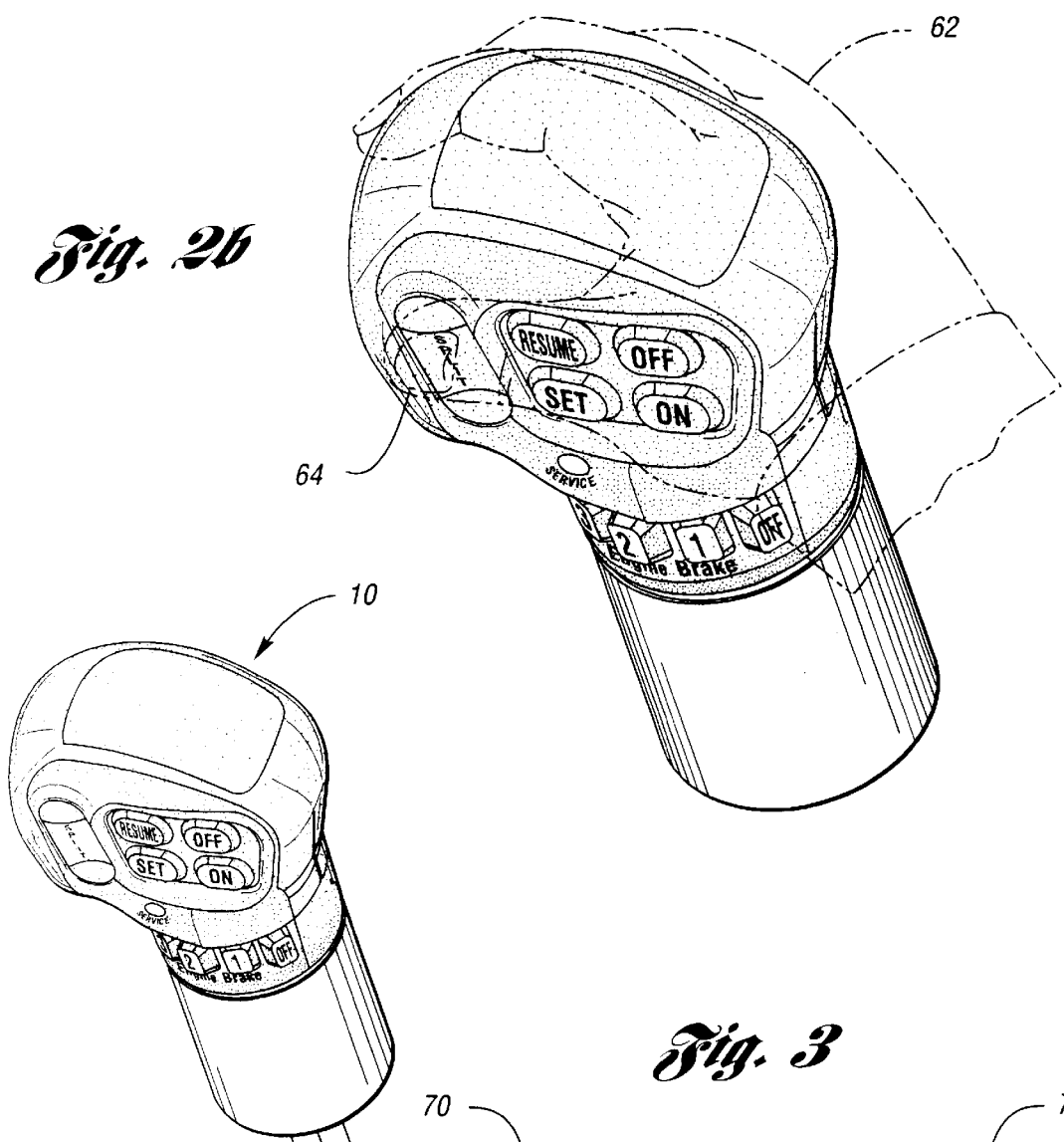
FIG. 2b is a perspective view of the transmission control lever of FIG. 1 with an operator right hand (shown in phantom) positioned on the side of the control lever in a wrapped-around orientation so that the operator's thumb may activate and control the various function control switches.

With reference to FIG. 1 of the drawings, shown generally is a motor vehicle transmission control lever 10 according to the present invention having a user interface 12 mounted thereon. User interface 12 is an integral part of the shift knob 11 on the end of control lever 10. As may be appreciated by one of ordinary skill in the art, FIG. 1 illustrates a side elevation of the driver's side of shift lever 10 for left-hand-drive vehicles. Of course, the present invention may also be employed in right-hand-drive vehicles in which case the mirror image of user interface 12 is provided. In either case, user interface 12 generally faces the driver of the vehicle.

Interface 12 is preferably positioned on driver's side face 13 and includes a first plurality of switches 22 for preferably operating a cruise control module. A second plurality of switches 24 preferably controls activation level of an engine brake. A ratio switch 26 preferably modifies a transmission ratio determined by position of transmission control lever 10. In one embodiment, ratio switch 26 controls operation of an auxiliary gearset of the splitter gear or range-change gear variety of a transmission. Each of the systems for cruise control, engine brake, and transmission ratio are well-known in the art. First and second pluralities of switches (shown collectively as areas 22 and 24, respectively), and ratio switch 26 are most preferably positioned and oriented on lever 10 to be thumb-operable without repositioning of the driver's hand or palm. Alternatively, at least ratio switch 26 and first switches 22 are positioned to be thumb-operable without repositioning of the driver's hand or palm. As such, first switches 22 and ratio switch 26 are preferably within about 2.5 inches from the top surface to provide thumb operation from a top hand position. Furthermore, ratio switch 26 is preferably within about 2.5 inches from the back surface to provide thumb operation from a side or wrap-around position. In one embodiment, second switches 24 are positioned about 3 inches below surface 100.

Again, interface 12 includes a number of switches for controlling various transmission and engine control features, discussed further herein. In a typical left-hand drive automobile such as those commonly found throughout North America, driver's side face 13 of control lever 10 is directed toward the driver (operator) of the vehicle. Such driver is able to operate control lever 10 with his or her right hand 52 (best shown in FIGS. 2a and 2b). Also included in control lever 10 is front surface 14, which faces toward the front of the vehicle and rear surface 16 which faces toward the rear of the vehicle. Control lever 10 further has a tapered neck portion 18. A sleeve 20 extends from tapered neck portion 18 to the vehicle's transmission 78 (represented schematically in FIG. 3).

Included in control lever 10 is a generally trapezoidal portion 28 having an arcuate top 30, and a bottom 32 which smoothly blends into neck portion 18. Trapezoidal portion 28 includes a plurality of switches 22 recessed relative to a front face 34 of trapezoidal portion 28, this plurality of switches 22 is preferably used for controlling a cruise control module 70 (shown schematically in FIG. 3). Trapezoidal portion 28 also includes a ratio switch 26 for selecting a transmission ratio based on the position of transmission control lever 10 in association with the auxiliary gearset 76, ratio switch 26 being raised relative to front face 13.

While transmission control lever 10 is commonly included in manual or semi-automatic transmissions as is well-known in the art, it may also be used with automatic transmissions. Of course, for manual transmissions, the gear selection pattern or sequence may be illustrated on control lever 10 or in another location so that the vehicle operator is able to refer to it while driving (for example, a four-speed H-gate pattern, not shown).

As previously mentioned, interface 12 includes a number of switches for controlling various vehicle functions. Specifically, areas are included for controlling the cruise control (area of switches 22), the engine brake (area of switches 24), and the transmission auxiliary gearset (area of switch 26). To allow the driver to control the various functions by feel rather than having to glance at the switches, each control function has unique switches. For example, first plurality of switches 22 is recessed relative to front face 34 of trapezoidal portion 28. Switches 22 are operable to control cruise control module 70 (best shown in FIG. 3) which is operatively connected to engine 74 in a manner effective to control the speed thereof and thus the speed of the vehicle according to the manner in which the plurality of cruise switches are actuated by the driver. Specifically, cruise control switches provide the well-known functions for set and resume in addition to "OFF" and "ON" functions. Cruise control area 22 is on a plane recessed from face 13, or front face 34 of trapezoidal portion 28, of control lever 10.

As shown in FIG. 1, cruise control area 22 includes the four momentary contact cruise switches: on switch 46, set switch 48, resume switch 50 (often labelled resume/accel), and off switch 52. On switch 46 turns the cruise control feature on allowing it to be accessed by the driver. Set switch 48 sets the cruise control speed at a particular vehicle speed desired. Holding resume switch 50 momentarily causes the cruise control to resume its "set" speed after it has been interrupted by, for example, depressing the brake pedal 80 or the clutch pedal 82, both referenced in FIG. 3. Clutch pedal 82 is used in vehicles where the transmission has a manually operated clutch that is operable to interrupt the cruise control feature. Lastly, off switch 52 turns the cruise feature off. With regard to the functions of the individual cruise control switches, it is equally viable to have a single switch perform both the on and off functions, and thereby allow for a fourth switch to perform a pause or deceleration function.

With continuing reference to FIG. 1, second plurality of switches (of area 24) are preferably raised relative to neck portion 18. In one embodiment, second plurality of switches 24 are used to control the level of engine braking. Engine braking as used herein refers to operation of any of a number of well known retarding devices which supplement the vehicle's foundation brakes. Such devices including exhaust brakes, compression brakes, driveline retarders, and the like. As such, switches 24 may be used to control any such retarder whether located at the engine or some other point in the vehicle driveline.

Figure 3:
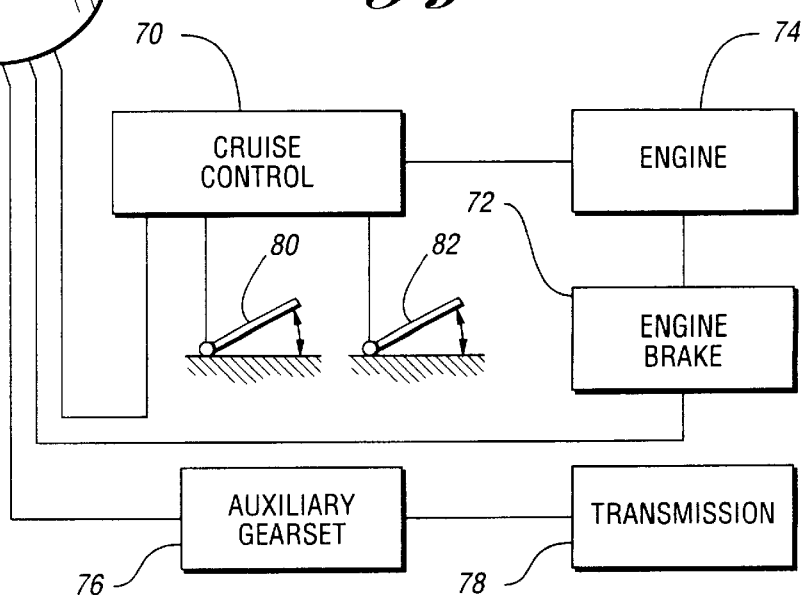
FIG. 3 is a perspective view of the transmission control lever according to the present invention schematically showing its connection to the cruise control, engine brake and auxiliary gearset.

As illustrated in the block diagram of FIG. 3, engine brake 72 may be operatively connected to engine 74 to brake the engine according to the particular one of the plurality of engine brake switches selected by the driver. Engine brake control area 24 is shown in the neck portion 18 of control lever 10. Engine brake control area 24 includes four momentary engine brake switches: off switch 40, first switch 41, second switch 42, and third switch 43. Each switch is preferably operative to actuate a different level of braking or retarding when the driver releases the accelerator pedal.

Ratio switch 26 is preferably contoured in a manner to be uniquely identified by the driver relative to the various other thumb operable switches. In one embodiment, ratio switch 26 includes upper and lower portions which are raised relative to face 13. Preferably, ratio switch 26 includes a semi-hemispherical portion at either end for operation of a two-position function, such as activation of a transmission splitter gear or range unit.

As best illustrated in FIG. 1, ratio switch 26 is positioned toward front surface 14 of control lever 10, adjacent cruise control area 22. Ratio switch 26 is shown as the toggle or rocker switch variety selectable between two positions 56 and 58. In a preferred embodiment, ratio switch 26 is operative to modify a transmission ratio determined by position of the transmission control lever in association with an auxiliary gearset. While ratio switch is marked "split" in FIGS. 1–3, it is representatively shown in FIG. 7 without markings to illustrate that it may be of either variety of ratio switch. For transmissions which include both range and splitter options, a separate range switch may be positioned as illustrated and described with reference to FIGS. 7 and 9.

As illustrated in the block diagram of FIG. 3, auxiliary gearset 76 is operatively connected to a vehicle transmission or main gearbox 78 in a manner effective to control multi-speed gear systems in the transmission. Typically, a two-speed auxiliary gearset is integrated with a four or five-speed main gearbox to provide a total of eight or ten speeds, respectively. Such an arrangement may also be combined with a range unit to effectively double the available number of gear ratios.

Again referring to FIG. 1, a service indicator 60 is preferably positioned on face 12 of control lever 10. Service indicator 60 is a lamp or light 61 which is preferably in communication with a control module such as a transmission control module, engine control module, vehicle control module, or the like. Service indicator 60 is illuminated to indicate the need for service of a particular vehicle component depending upon the application. Service indicator 60 is positioned on front face 13 adjacent bottom portion 32 of trapezoidal portion 28.

Referring now to FIGS. 1 and 2, first plurality of switches 22 and ratio switch 26 are positioned to be thumb-operable by an operator's hand 62 while resting on the top of the trapezoidal portion. Furthermore, in a preferred embodiment, first and second pluralities of switches 22 and 24, respectively, and ratio switch 26 are positioned to be thumb-operable from a top hand positioning (FIG. 2a) and from a wrapped hand position (FIG. 2b). Each switch is located within about 2.5 inches of a top surface of the user interface. Also included is a cushioned portion 98 substantially encompassing the first plurality of switches and the ratio switch, the cushioned portion 98 having an arcuate top 100 serving as a palm rest for a top-resting shifting position.

Referring now to FIG. 2a, shown is a driver's hand 62 positioned on the top of control lever 10 so that the driver's thumb 64 may activate any of the switches discussed above for each of areas 22, 24 and 26. This ergonomic switch placement eliminates unnecessary hand movement allowing all switches to be within thumb reach for activation. This positioning also eliminates operational distractions caused by the driver reaching for and/or looking for any of the above switches, which prior art systems position on the dashboard or other area. In such prior art systems, the driver must remove his/her hand 62 from the control lever 10 in order to activate any of the features incorporated into control lever 10. As shown in FIG. 2b, the present invention also allows the operator to utilize a side or wrapped-around position while having the opportunity to activate the various control switches discussed above with the driver's thumb.

FIG. 4 illustrates a top plan view of control lever 10 showing top 100. As previously described, ratio switch 26 and engine brake switches are preferably raised relative to face 13. FIG. 5 illustrates a bottom view of control lever 10, again showing ratio switch 26 raised relative to face 13 and engine brake switches raised relative to neck portion 18. Also shown is bottom 86 of sleeve 20. FIG. 6 illustrates a side view of transmission control lever 10. Illustrated is a passenger face 88 representing the face opposite face 13. Face 88 is directed away from the driver and toward passenger seat of the vehicle.

Figure 7:
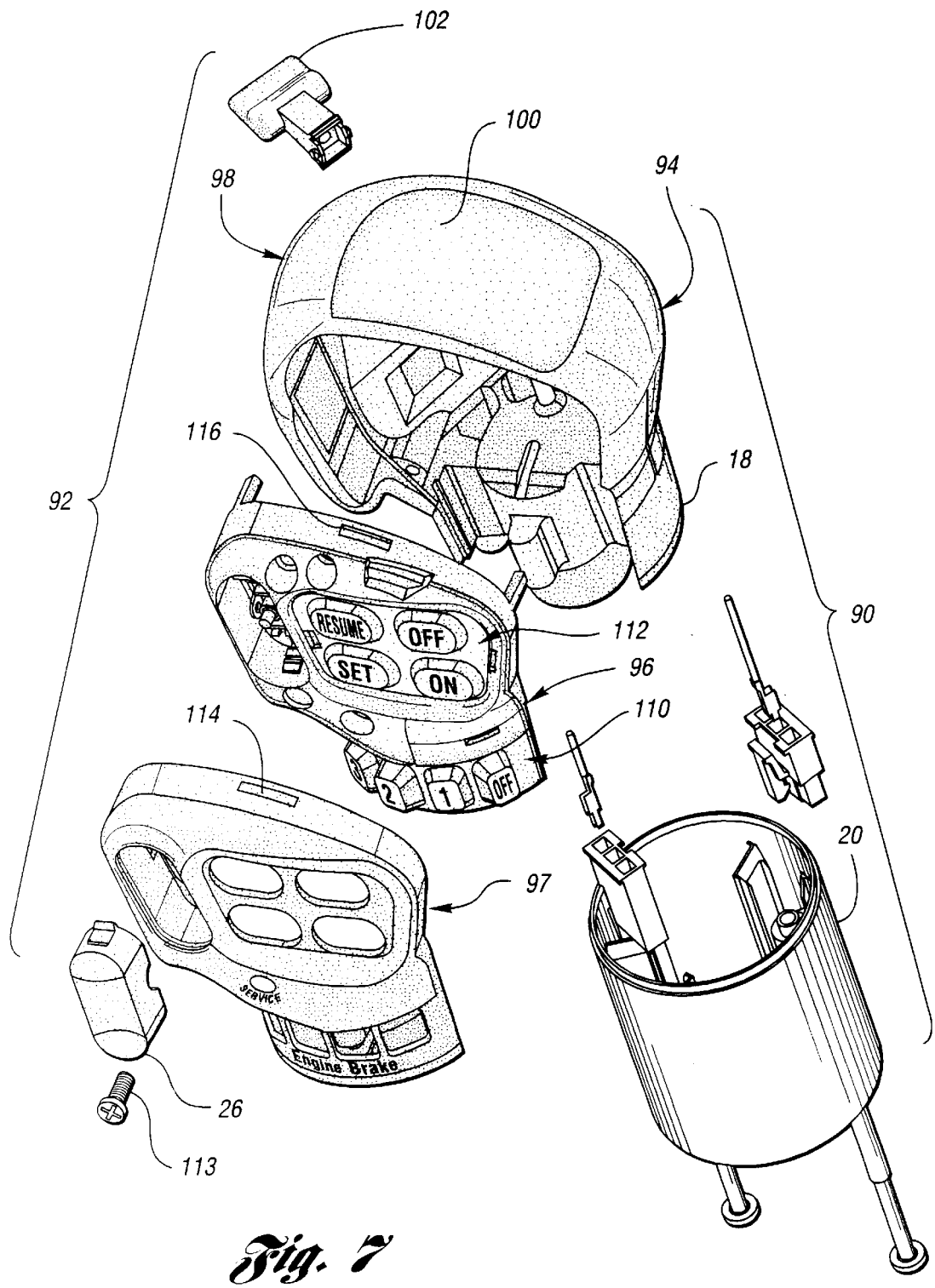
FIG. 7 is a perspective assembly view illustrating the assembly of the transmission control lever according to the present invention.
Figure 9:
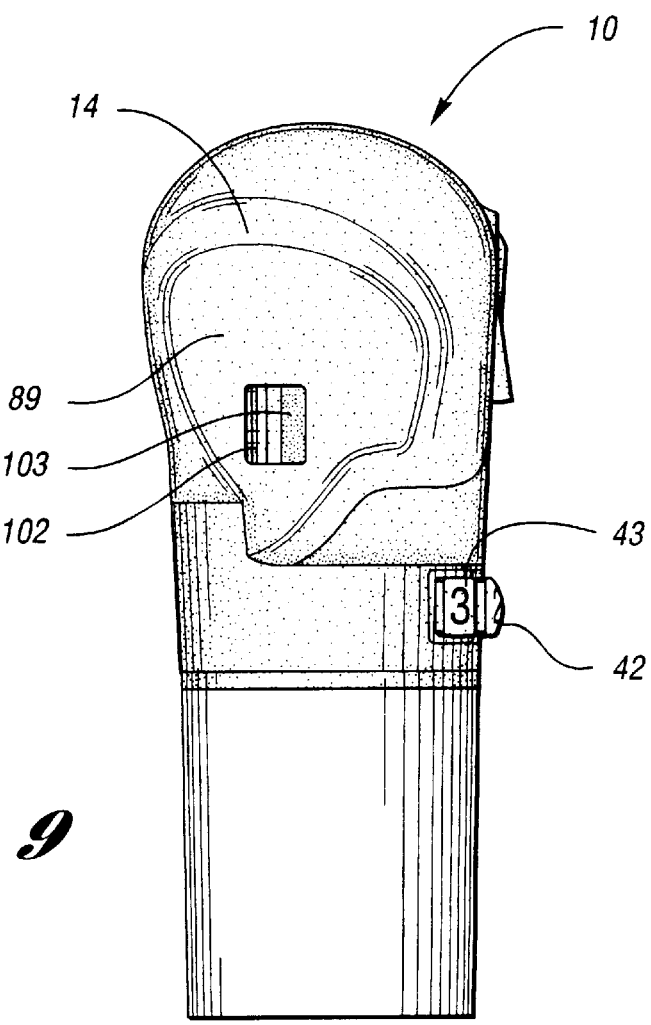
FIG. 9 is a front elevational view of the transmission control lever according to the present invention.

FIG. 7 is an assembly drawing illustrating an assembly of components which form control lever 10 discussed herein. Assembly 90 includes handle subassembly 92 which includes molded rubber cover 94 substantially encompassing four sides of the trapezoidal portion 28 and neck portion 18. Preferably, molded rubber cover 94 is made of a thermoplastic elastomer material. Handle subassembly 92 also includes a concave portion 89 generally opposite ratio switch 26 as best illustrated in FIGS. 6 and 9. Concave portion 89 facilitates operation of control lever 10 using a side or wrap-around hand position.

Provided in cover 94 and face plate or bezel cover 97 are openings for ratio switch 26, cruise control buttons 46, 48, 50 and 52, and brake control switches 40, 41, 42, and 43. Also included in handle subassembly 92 is a bezel 96 which is received by cover 94. Bezel 96, which is preferably made of a nylon 6/6 material, includes an engine brake keypad 110, preferably made of a silicone elastomer material, for engine brake control switches 40, 41, 42 and 43. Bezel 96 also includes a cruise control keypad 112, also preferably made of a silicone elastomer material, for cruise control switches 46, 48, 50 and 52. Bezel 96 is preferably secured to cover 94 using a fastener 113 or a series of fasteners representative of that illustrated. Bezel cover 97, preferably made of a polycarbonate material, includes a groove 114 which cooperates with a protrusion 116 on bezel 96 to secure bezel cover 97 to bezel 96 prior to insertion into cover 94. Handle 92 is then inserted into sleeve 20 and secured thereto by appropriate fasteners as illustrated.

As also shown in FIG. 7, sleeve 20 includes electrical connectors for electrically connecting the various switches to a control module in communication with the controlled devices, such as a braking device 72, cruise control module 70, and auxiliary gearset 76 of transmission 78. The various switches may be multiplexed if desired to reduce the number of wires leading to control lever 10. In a preferred embodiment, control lever 10 is used to operate both a splitter and a range unit of a multi-speed compound transmission. In this embodiment, assembly 90 includes a range switch 102 which is positioned opposite the splitter switch 26 in a generally diagonal orientation toward the front and right side of handle 92, preferably in concave area 89.

Figure 8:
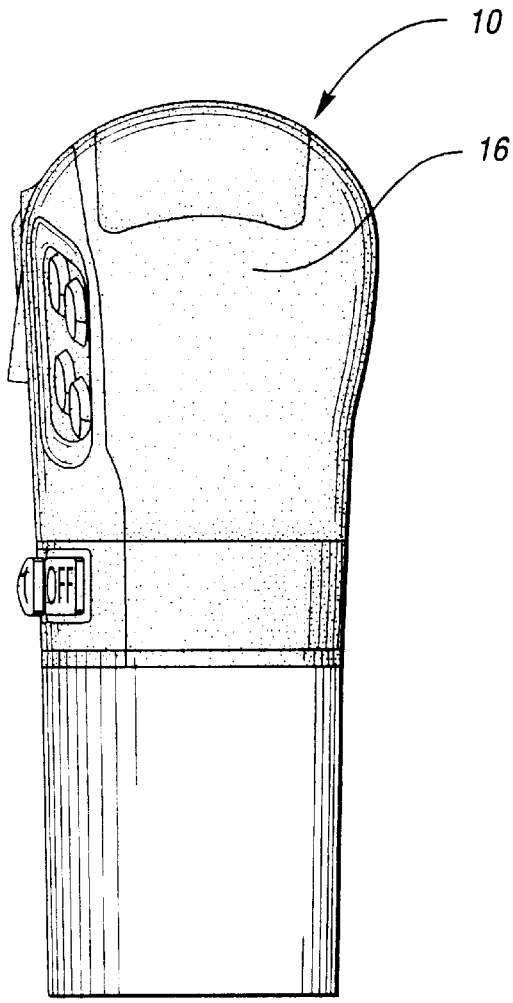
FIG. 8 is a rear elevational view of the transmission control lever according to the present invention.

FIG. 8 provides a rear view of control lever 10. FIG. 9 provides a front elevational view of control lever 10 which illustrates the placement of a range switch, such as range switch 102 in opening 103 illustrated in FIGS. 6 and 7.

It is understood, of course, that while the forms of the invention herein shown and described include the best mode contemplated for carrying out the present invention, they are not intended to illustrate all possible forms thereof. It should also be understood that the words used are descriptive rather than limiting, and that various changes may be made without departing from the spirit or scope of the invention as claimed below.

What is claimed is:

1. A user interface for mounting on a motor vehicle transmission control lever, the interface comprising:
    a first plurality of switches for operating a cruise control module;
    a second plurality of switches for controlling an activation level of an engine brake; and
    a ratio switch for modifying a transmission ratio, wherein the first and second pluralities of switches and the ratio switch are positioned to be thumb-operable by an operator without requiring the operator to reposition a palm.

2. The user interface of claim 1 wherein the ratio switch is operable for controlling the operation of a splitter gear of a transmission.

3. The user interface of claim 1 wherein the ratio switch is operable for controlling the operation of a range gear of a transmission.

4. The user interface of claim 1 wherein the first and second pluralities of switches and the ratio switch are positioned to be thumb-operable from a top hand positioning and from a side hand position.

5. The user interface of claim 1 wherein each switch is within about 2.5 inches of a top surface of the user interface.

6. The user interface of claim 1 wherein the first plurality of switches is recessed relative to a front face of the control lever.

7. The user interface of claim 1 wherein the second plurality of switches is raised relative to a front face of the control lever.

8. The user interface of claim 1 wherein the ratio switch is raised relative to a front face of the control lever.

9. The user interface of claim 1 further comprising a service indicator for indicating the need for service of a component of said motor vehicle.

10. The user interface of claim 9 further comprising a service indicator.

11. The user interface of claim 1 wherein the first and second pluralities of switches and the ratio switch are positioned on a single side of the user interface, the single side being generally oriented for facing a driver's seat when installed on the control lever in a vehicle.

12. The user interface of claim 1 further comprising a cushioned portion substantially encompassing the first plurality of switches and the ratio switch, the cushioned portion having an arcuate top serving as a palm rest for a top-resting shifting position.

13. A handle for a motor vehicle transmission shift lever, the handle comprising:
    a tapered neck portion having a plurality of engine brake switches for controlling an engine brake;
    a generally trapezoidal portion having an arcuate top and a bottom which smoothly blends into the tapered neck portion, the trapezoidal portion including a plurality of cruise switches recessed relative to a front face of the trapezoidal portion, the plurality of cruise switches for controlling a cruise control, the trapezoidal portion also including a ratio switch for selecting a transmission ratio, the ratio switch being raised relative to the front face; and
    a service indicator positioned on the front face, wherein the plurality of cruise switches and the ratio switch are positioned to be thumb-operable by an operator's hand while resting on the top of the trapezoidal portion.

14. The handle of claim 13 further comprising a molded rubber cover substantially encompassing four sides of the trapezoidal portion.

15. The handle of claim 14 wherein the rubber cover includes a concave portion oriented on a side generally opposite the front face for accommodating placement of the operator's hand while resting on the side of the trapezoidal portion.

16. A transmission control lever comprising:
    a lever face having a recessed area with a plurality of cruise control switches for governing a cruise control system, a raised area with at least one auxiliary gearset switch for governing a transmission auxiliary gearset, and a tapered neck portion with a plurality of engine brake switches for governing an engine brake, each of the recessed area, the raised area, and the tapered neck portion positioned so that an operator may control each of the corresponding switches by thumb activation.

17. The transmission control lever of claim 16, wherein the lever face further includes a service light for indicating the need for service of at least one of the cruise control system, transmission auxiliary gearset, and engine brake.

18. The transmission control lever of claim 16, wherein the recessed area includes four switches.

19. The transmission control lever of claim 16, wherein the raised area includes a two-position switch.

20. The transmission control lever of claim 16, wherein the neck portion includes four engine brake switches.

* * * * *